United States Patent [19]

Dinkins

[11] Patent Number: 5,806,006
[45] Date of Patent: Sep. 8, 1998

[54] METHOD OF CONTROLLING POWER OUTPUT BY A PRIMARY POWER SOURCE SO AS TO CONSERVE POWER IN AN ELECTRONIC COMMUNICATION DEVICE

[75] Inventor: Gilbert M. Dinkins, Herndon, Va.

[73] Assignee: Eon Corporation, Herndon, Va.

[21] Appl. No.: 349,488

[22] Filed: Dec. 2, 1994

[51] Int. Cl.⁶ .................................................. H04B 1/38
[52] U.S. Cl. ..................... 455/574; 455/38.3; 455/343; 455/517
[58] Field of Search .................................. 455/38.3, 343, 455/127, 54.1, 34.1, 54.2, 517, 522, 114, 550, 572, 574, 575; 379/57; 370/311; 375/222

[56] References Cited

U.S. PATENT DOCUMENTS

| | | | |
|---|---|---|---|
| 4,701,943 | 10/1987 | Davis et al. | 379/57 |
| 5,241,542 | 8/1993 | Natarajan et al. | 455/343 |
| 5,278,831 | 1/1994 | Mabey et al. | 455/343 |
| 5,461,558 | 10/1995 | Patsiokas et al. | 455/343 |
| 5,519,506 | 5/1996 | D'Avello et al. | 455/343 |
| 5,535,207 | 7/1996 | Dupont | 455/34.1 |

*Primary Examiner*—Reinhard J. Eisenzopf
*Assistant Examiner*—Doris To
*Attorney, Agent, or Firm*—Cushman Darby & Cushman IP Group of Pillsbury Madison & Sutro, LLP

[57] ABSTRACT

A system for reducing power consumption by a portable electronic communication device. Modem circuit for receiving messages and for transmitting messages from a portable electronic communication device are powered via power source control/switch coupled thereto. A logic circuit is coupled to the power source control/switch for control the power source control/switch to selectively deliver power to the modem circuit of the portable electronic communication device during a first time interval and to withhold power from the modem circuit of the portable electronic communication device during a second time interval. A low power control clock/counter is coupled to the logic circuit means for measuring the duration of the first and second time intervals. In one embodiment, the first time interval occurs while the modem circuit of the portable electronic communication device is transmitting or receiving messages. Thus, the modem circuit uses power only when transmitting and receiving, but does not consume substantial power during standby periods.

5 Claims, 4 Drawing Sheets

METHOD OF CONTROLLING POWER OUTPUT BY A PRIMARY POWER SOURCE SO AS TO CONSERVE POWER IN AN ELECTRONIC COMMUNICATION DEVICE

This Application has a related co-pending U.S. patent application Ser. No. 07/966,414 to Gilbert M. Dinkins entitled "INTERACTIVE NATIONWIDE DATA SERVICE COMMUNICATION SYSTEM FOR STATIONARY AND MOBILE BATTERY OPERATED SUBSCRIBER UNITS" filed Oct. 26, 1992.

TECHNICAL FIELD

The present claimed invention relates to the field of portable electronic devices used in communication applications. More specifically, the present claimed invention relates to reducing the power consumption of such devices.

BACKGROUND ART

Advances in technology and manufacturing have made it possible to develop small lightweight portable electronic devices for use in communication applications. Common pagers and hand-held cellular phones are an example of such devices. However, despite the small size of these electronic devices, they still must be powered. Typically, batteries are used as the source of power for these portable devices. Often the power consumption of the portable electronic device is such that the life of the battery is severely limited.

As an example of limited battery life, standard one-way pagers currently in use have a nominal battery life of approximately only one month. The limited one month lifetime of the battery is based upon the assumptions that the one-way pager is in receive mode for only 12 hours per day, and further that the one-way pager receives only two messages during each 12 hour period. Thus, it is apparent that using the one-way pager for greater than 12 hours each day, or an increase in the number of messages received will further decrease the lifetime of the battery power source.

As another example of limited battery life in portable electronic communication devices, hand-held cellular telephones have a battery life of approximately only 24 hours when waiting to receive a call (standby mode). However, if the cellular phone is used even for only one hour of transmission time, the time period during which the cellular phone is able to maintain standby mode is reduced to only approximately 12 hours.

Likewise, other portable electronic communication devices, such as, for example, data appliances used for interactive television purposes also suffer from limited battery life. In order to render such a device useful to the average consumer, power consumption must be reduced such that the lifetime of power sources, such as batteries, may be extended orders of magnitude beyond what is currently available. Additionally, it is desirable that such a reduction of power consumption be accomplished without significantly increasing the cost of the data appliance or other portable electronic device.

Thus, the need has arisen for a low-cost system to reduce power consumption in a portable electronic communication device, such as for example a data appliance used in interactive television applications, so that the lifetime of power sources such as batteries may be extended orders of magnitude beyond what is currently available.

DISCLOSURE OF INVENTION

It is therefore an object of the present invention to provide a low-cost system to reduce power consumption in a portable electronic communication device so that the lifetime of power sources such as batteries may be extended orders of magnitude beyond what is currently available. The above object has been achieved with an inexpensive system which shuts down the modem circuits of the portable electronic communication device during standby periods. The system also "wakes up" the modem circuits at selected intervals as needed so that the device can either receive incoming messages or transmit messages as required. Thus, the modem circuits use power only when transmitting and receiving, but do not consume power during standby periods. As a result, the power consumption of the portable electronic communication device is reduced as the modem circuits only consume power while the portable electronic communication device is transmitting or receiving messages. In so doing, the present claimed invention is able to extend the lifetime of power sources, such as batteries, orders of magnitude beyond what is currently available.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
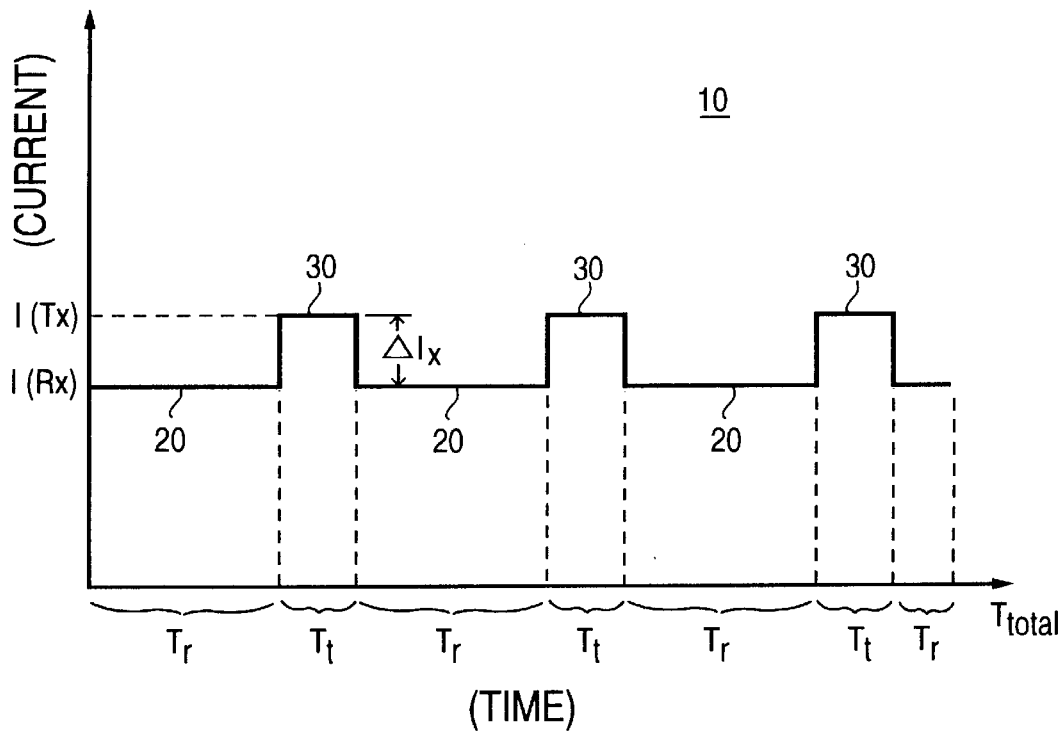
FIG. 1 is a graph illustrating Time vs. Current for a typical portable electronic communication device.

With reference now to FIG. 1, a graph 10 illustrating Time vs. Current for a typical portable electronic communication device wherein the device consumes power at a conventional rate is shown. As shown in graph 10, a typical portable electronic communication uses an amount of current $I(R_x)$ during standby periods of time 20 when the device is waiting to receive a message or is actually in the process of receiving a message. The length of the reception periods 20 is given by $T_r$ as shown. A much greater amount of current $I(T_x)$ is used by the device during periods of time 30 when the device is transmitting a message. The length of the transmission periods 30 is given by $T_t$ as shown, wherein the length $T_t$ of each of the transmission periods 30 is shown as the same for simplicity. Therefore, the average amount of current used by the portable electronic communication device during the time period $T_{total}$ can be calculated as follows:

(1) $I_{ave.} = I(R_x) + (\Delta I_x)(T_t)(\text{\# of transmission periods 30})(1/T_{total})$ where $\Delta I_x$ is the difference, $(I(T_x)-I(R_x))$, between current $I(T_x)$ used during transmission periods 30 and current $I(R_x)$ used during standby or receive periods 20. Furthermore, since there are 3 transmission periods 30 in graph 10 of FIG. 1, (1) can be rewritten as;

(2) $I_{ave.} = I(R_x) + (\Delta I_x)(T_t)(3)(1/T_{total})$.

Referring still to FIG. 1, as seen from graph 10, current consumption during transmission periods 30 is considerably higher than current consumption during standby or receive periods 20. However, the portable electronic communication device is typically in standby mode much longer than it is in transmission mode. Therefore, in order to reduce power consumption of the portable electronic communication device, it is imperative that current usage during receive or standby mode is controlled.

Figure 2:
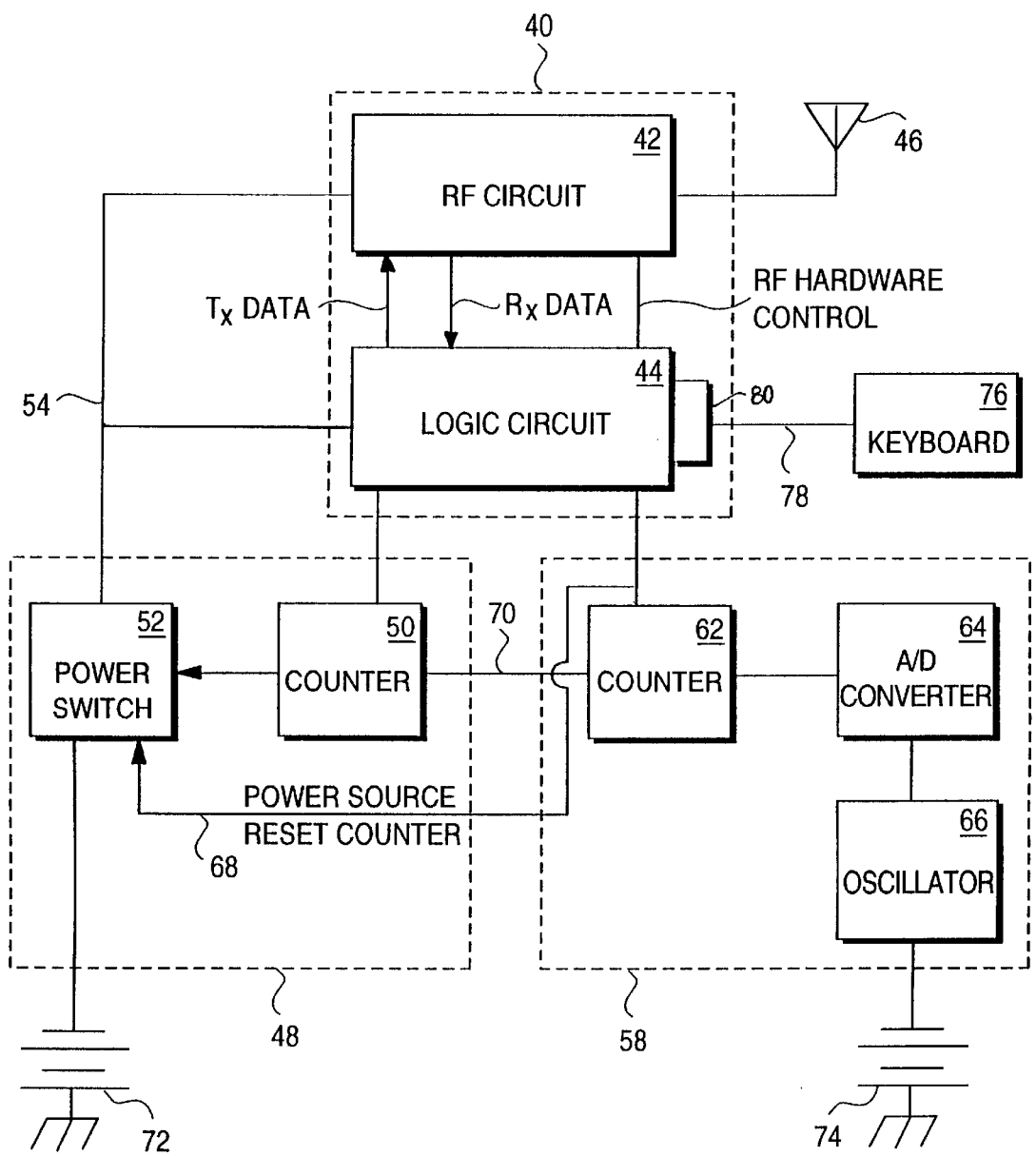
FIG. 2 is a schematic block diagram illustrating the system of the present claimed invention.

With reference now to FIG. 2, a schematic block diagram illustrating the system of the present claimed invention is shown. A modem circuit used for receiving messages and for transmitting messages from a subscriber unit used in interactive television applications is schematically shown as 40. A detailed description of such a subscriber unit can be found in pending U.S. patent application Ser. No. 07/966,414 to Gilbert M. Dinkins entitled "INTERACTIVE NATIONWIDE DATA SERVICE COMMUNICATION SYSTEM FOR STATIONARY AND MOBILE BATTERY OPERATED SUBSCRIBER UNITS" filed Oct. 26, 1992 which is incorporated herein by reference. Although such a device is used as the portable electronic communication device in the present embodiment, the present claimed invention is also well suited for use with other portable electronic communication devices well known in the art. Modem circuit 40, as shown in the embodiment of FIG. 2, includes an rf circuit 42 and a logic circuit 44. Rf circuit 42 also has an antenna 46 coupled thereto to facilitate RF signal communication with rf circuit 42. A power source control/switch 48 is used to deliver power to rf circuit 42 and logic circuit 44. In the present embodiment, power source control/switch 48 includes a counter 50 and a power switch 52. Power switch 52 is coupled to rf circuit 42 and logic circuit 44 via line 54. Counter 50 is coupled to logic circuit 44 via line 56. Logic circuit 44 controls power source control/switch 48 such that power source control/switch 48 selectively delivers power to rf circuit 42 during a first time interval and withholds power from rf circuit 42 during a second time interval. Although power source control/switch 48 of the present embodiment includes the above-listed components, the present invention is also well suited to other types of power source control/switches having different components.

Additionally, a low power control clock/counter 58 is coupled to the logic circuit means via line 60 for measuring the duration of the first and second time intervals. In the present embodiment, low power control clock/counter 58 includes a counter 62, an A/D converter 64, and an oscillator 66. Although low power control clock/counter 58 of the present embodiment includes the above-listed components, the present invention is also well suited to other types of low power control clock/counters having different components. In the present embodiment, the first time interval occurs while modem circuit 40 is transmitting or receiving messages. Thus, modem circuit 40 uses power only when transmitting and receiving, but does not consume power during standby periods. As a result, the power consumption of the portable electronic communication device is reduced as modem circuit 40 of the subscriber unit only consumes power while the subscriber unit is transmitting or receiving messages.

Referring again to FIG. 2, rf circuit 42 has additional connections to logic circuit 44. For example, a transmission data line ($T_x$ Data), and a reception data line ($R_x$ Data) along with an RF control line (RF Hardware Control) also connect rf circuit 42 and logic circuit 44. Additionally, a power source reset control line 68 and a pulse off/on control line 70 connects power source control/switch 48 and low power control clock/counter 58.

With reference still to FIG. 2, power source control/switch 48 is coupled to a power source 72 such as, for example a battery. In the present embodiment, a AA size battery is used, although the present claimed invention is also well suited to the use of any numerous other types of batteries well known in the art. Similarly, low power control clock/counter 58 is coupled to a power source 74. In the present embodiment, power source 74 is a standard watch battery operating continuously using only approximately 3 $\mu$A of current. Although such a battery is used as power source 74 in the present embodiment, the present claimed invention is also well suited to the use of any numerous other types of batteries well known in the art. Because, modem circuit 40 uses power only when transmitting and receiving, but does not consume power during standby periods the power consumption of the subscriber unit is greatly reduced. Thus, battery 72 is able to last much longer than was previously possible. In fact, the lifetime of battery 72 is extended orders of magnitude beyond what was previously possible in portable electronic communication devices.

With reference again to FIG. 2, in the present embodiment, a keyboard 76 is coupled via line 78 to a keyboard interface 80 connected to logic circuit 44. Keyboard 76 allows a user of the present invention to control or program logic circuit 44. Thus, a user of the present invention can manually select the duration of the first and second time intervals. That is, the user can select the duration of the time periods during which logic circuit 44 withholds power from and delivers power to rf circuit 42. Although the present embodiment contains a keyboard 76, the present claimed invention is also well suited to not having a keyboard or other manual logic circuit controlling device attached to modem circuit 40.

Figure 3:
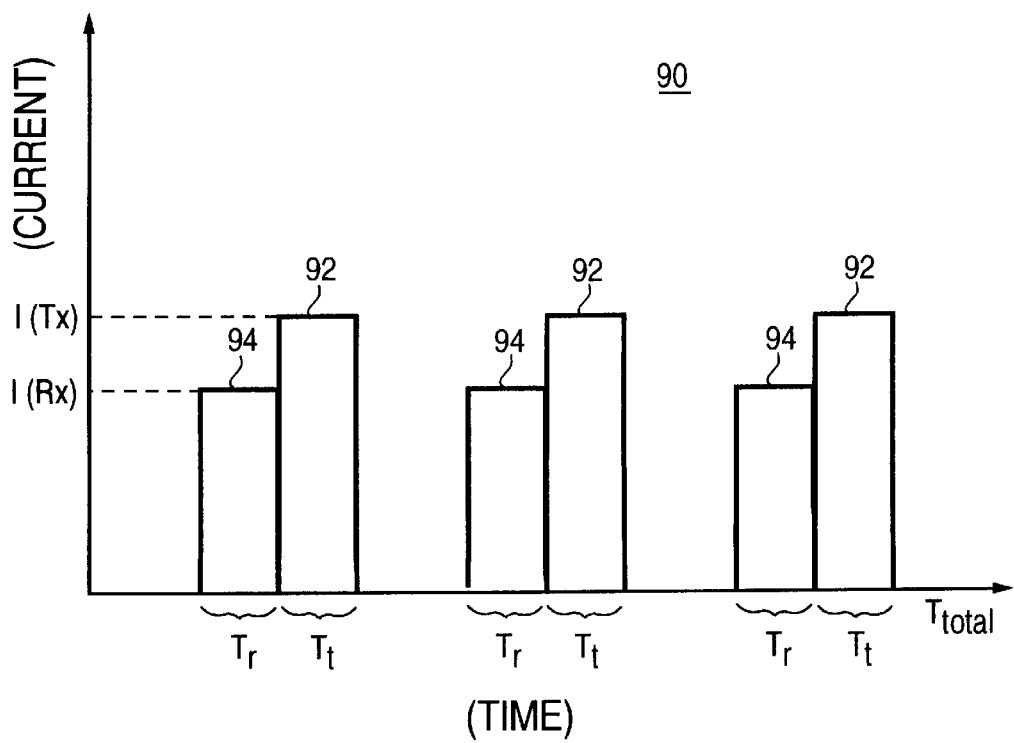
FIG. 3 is a graph illustrating Time vs. Current for a subscriber unit employing the power saving system of the present claimed invention.

With reference now to FIG. 3, a graph 90 illustrating Time vs. Current from power source control/switch 48 for a subscriber unit employing the power saving system of the present claimed invention is shown. As shown in graph 90, the subscriber unit uses an amount of current $I(T_x)$ during periods of time 92 when the device is transmitting a message. The length of the transmission periods 92 is given by $T_t$ as shown, wherein the length $T_t$ of each of the transmission periods 92 is shown as the same for simplicity. Likewise, the subscriber unit uses an amount of current $I(R_x)$ during periods of time 94 when the device is in reception mode. The length of the reception modes 94 is given by $T_r$ as shown. Therefore, the amount of current in ampere-seconds used by the subscriber unit is calculated as follows:

(3) $I = I(T_x)(T_t)(\text{\# of transmission periods 92 in one second}) + I(R_x)(T_r)(\text{\# of transmission periods 94 in one second})$.

Assuming that in one second there are 3 transmission and reception mode periods 92 and 94 as shown in graph 90 of FIG. 3, (3) can be rewritten as;

(4) $I = I(T_x)(T_t)(3) + I(R_x)(T_r)(3)$

Unlike the prior art, shown in FIG. 1, the power saving system of the present claimed invention does not consume power during standby periods except for the micro-amperes required by low power control clock/counter 58. Thus, the amount of power consumed by the subscriber unit employing the power saving system of the present invention is substantially reduced over the prior art. Therefore, the lifetime of the power source such as, for example, a battery can be greatly extended compared to what has previously been possible.

As a quantitative example of the difference in power source lifetime between a device employing the power saving system of the present claimed invention and a device which does not, the following examples are given. In the prior art, assuming that the transmitting current $I(T_x)$ is 0.325A, that the receiving current is 0.200A, and that the portable electronic communication device is operable for 12 hours in each 24 hour period, the following calculations can be made. A typical portable electronic communication device transaction each hour consists of one transmission lasting 3 seconds, and one reception requiring the portable electronic communication device to be in standby mode for the entire hour or 3600 seconds. Thus, the current usage per hour can be determined as follows:

(5) 3 sec.(0.325A)=0.975 Ampere Seconds per transmission
(6) 3600 sec.(0.200A)=720 Ampere Seconds per standby/receive mode.

Combining the transmission and standby current usage gives a total current usage per hour of:

(7) (0.975+720) Ampere Seconds=approximately 721 Ampere Seconds.

A standard AA battery has a capacity of approximately 1.2 Ampere Hours or 4,320 Ampere Seconds. Thus, assuming one transaction per hour as set forth in equations (5)–(7) above, the total number of transactions possible using a single AA battery can be found to be:

(8) 4,320 Ampere Seconds/721 Ampere Seconds=6 Transactions.

Furthermore, assuming as set forth above that the portable electronic communication device is operational 12 hours per day with one transaction per hour it is easily understood that 12 transactions occur per day. With 12 transactions occurring per day, in an average 30 day month, 30×12 or 360 transactions occur per average month. Thus the lifetime in months of a standard AA battery when used in a portable electronic communication device can be calculated as follows:

(9) 6 Transactions/360 Monthly Transactions=0.017 months=0.51 days

Therefore, using the assumptions above, the typical life of a AA battery in a portable electronic communication device would by approximately one half of one day.

In a device employing the power saving system of the present invention however, the lifetime of the standard AA battery is extended orders of magnitude beyond that found in the prior art. Using the same assumptions set forth above, wherein the transmitting current $I(T_x)$ is 0.325A, that the receiving current is 0.200A, and that the portable electronic communication device (a subscriber unit in the present embodiment) is operable for 12 hours in each 24 hour period, the following calculations can be made. In the present invention, because the subscriber unit consumes power only when transmitting or receiving messages, with the exception of the small amount of power needed for low power control clock/counter 58, a typical single subscriber unit transaction each hour consists of one transmission lasting 3 seconds, and one reception requiring the subscriber unit to be in standby mode for only 6 seconds. This is in stark contrast to the prior art, wherein the portable electronic communication device constantly remains in standby mode unless the device is transmitting. Thus, the current usage per hour in the present claimed invention can be determined as follows:

(10) 3 sec.(0.325A)=0.975 Ampere Seconds per transmission
(11) 6 sec.(0.200A)=1.200 Ampere Seconds per standby/receive mode.

Combining the transmission and standby current usage gives a total current usage per hour of:

(12) (0.975+1.20) Ampere Seconds=2.175 Ampere Seconds.

As stated above, a standard AA battery has a capacity of approximately 1.2 Ampere Hours or 4,320 Ampere Seconds. Thus, assuming one transaction per hour as set forth in equations (10)–(12) above, the total number of transactions possible using a single AA battery can be found to be:

(13) 4,320 Ampere Seconds/2.175 Ampere Seconds=1,986 Transactions.

Furthermore, assuming as set forth above that the subscriber unit is operational 12 hours per day with one transaction per hour it is easily understood that 12 transactions occur per day. With 12 transactions occurring per day, in an average 30 day month, 30×12 or 360 transactions occur per average month. Thus the lifetime in months of a standard AA battery when used in a subscriber unit employing the power saving system of the present claimed invention can be calculated as follows:

(14) 1,986 Transactions/360 Transactions per Month=5.52 months.

Therefore, in the present invention wherein the subscriber unit consumes power only when transmitting or receiving messages, with the exception of the small amount of power needed for low power control clock/counter 58, a usable battery life of approximately 5.5 months is attained. Thus, the power saving system of the present claimed invention is able to extend to the lifetime of a standard AA battery to (5.5 months/0.51 days) or approximately 325 times the lifetime found in the prior art.

Figure 4:
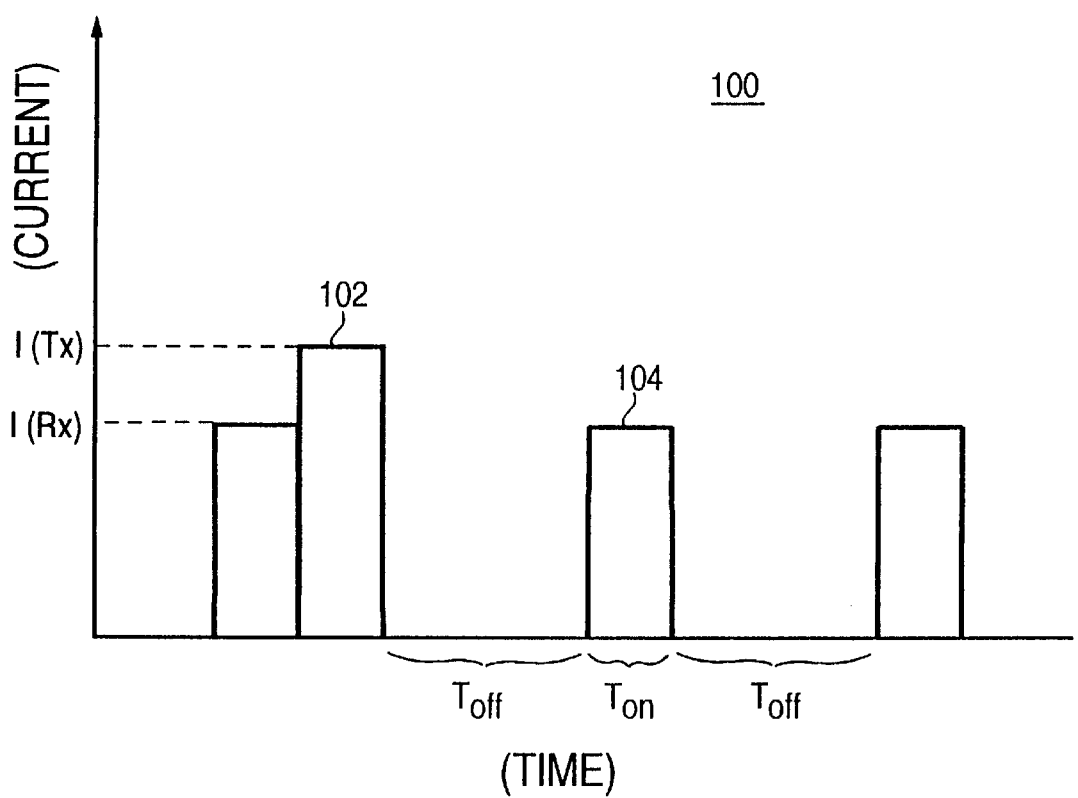
FIG. 4 is a graph illustrating protocol steps employed in the power saving system of the present claimed invention.
Figure 5:
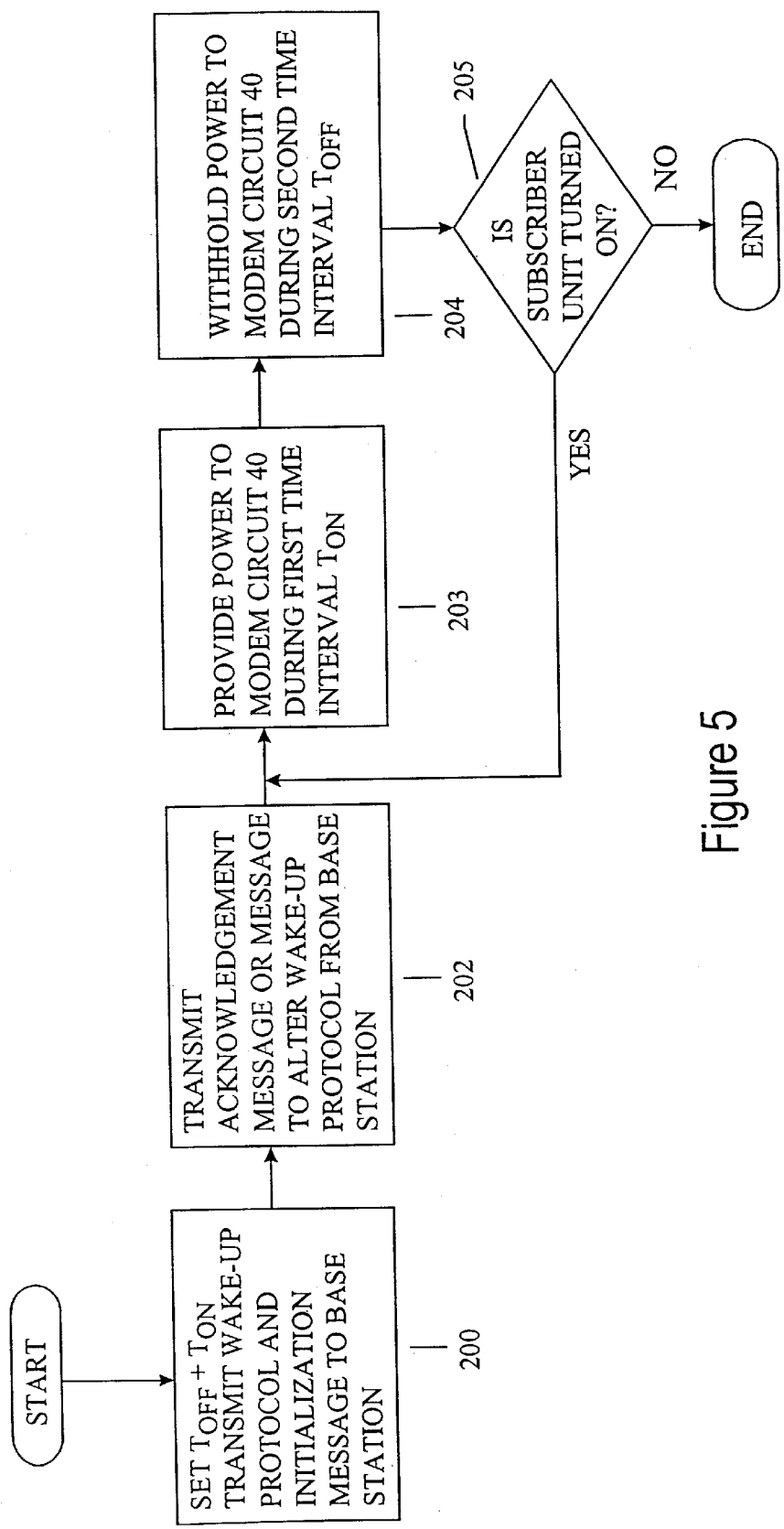
FIG. 5 is a flow chart illustrating protocol steps employed in the power saving system of the present claimed invention.

With reference next to FIGS. 4, and 5, the following is a detailed description of the operation of the power saving system of the present claimed invention as used in a subscriber unit.

Step 1: As shown in graph 100 of FIG. 4 and the flow chart of FIG. 5, when the subscriber unit is turned on at step 200 of FIG. 5, the unit initializes itself into the network by transmitting a message to a base station at step 102. The base station then recognizes the subscriber unit as active, stores the identification number of the subscriber unit for future reference, and completes the set-up communication with the subscriber unit at step 202 in FIG. 5.

Step 2: The subscriber unit also alerts the base station as to the nature of the wake-up protocol activated in the subscriber unit at step 200 in FIG. 5. That is, during initialization step 102 the subscriber unit transmits to the base station the duration of the first time interval $T_{on}$ during which the rf circuits of the subscriber unit will receive power and the duration of the second time interval $T_{off}$ during which the rf circuits of the subscriber unit will not receive power.

Step 3: Next, the subscriber unit transmits any necessary data and receives any data sent from the base station. The base station accordingly receives from or transmits to the subscriber unit any necessary data. The base station will then either accept and store the wake-up protocol, and time stamp itself to correspond to the time intervals of the subscriber unit, or the base station will override the wake-up protocol activated in the subscriber unit and select a different wake-up protocol. See step 202 in FIG. 5.

Step 4: After all communications with the base station have been completed, logic circuit 44 of FIG. 2 alerts power source control/switch circuit 48 of FIG. 2 that all transmissions and receptions are completed.

Step 5: Power source control/switch circuit 48 then shuts off or withholds power from modem circuit 40. See step 204 in FIG. 5. As such, modem circuit 40 does not remain in a standby mode constantly consuming power as in prior art systems. While power is withheld from modem circuit 50, low power control clock/counter 58 continues to run.

Step 6: With reference again to FIG. 4, at the proper time as specified in the wake-up protocol selected by the subscriber unit or by the base station, power source control/switch circuit 48 of FIG. 2 wakes up, that is, delivers power to modem circuit 40. See step 203 in FIG. 5. This step is shown at 104 of graph 100. The system repeats from Step 3, as many times as is desired as shown in step 205 of FIG. 5.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A system for reducing electrical power consumption by a portable electronic communication device comprising:

modem circuit means for receiving messages and for transmitting messages from a portable electronic communication device, a base station communicatively coupled to said modem circuit means, power source control/switch means coupled to said modem circuit means for delivering power to said modem circuit means of said portable electronic communication device, logic circuit means coupled to said power source control/switch means for controlling said power source control/switch means to selectively deliver power to said modem circuit means of said portable electronic communication device during a first time interval and to withhold power from said modem circuit means of said portable electronic communication device during a second time interval, wherein a duration of said first and second time intervals is determined by said base station, and wherein said duration of said first and second time intervals determined by said base station takes precedence over a duration of said first and second time intervals determined by a user of said portable electronic communication device, and low power control clock/counter means coupled to said logic circuit means for measuring said first and second time intervals.

2. A method for reducing the electrical consumption of an electronic communication device communicating with a base station comprising the steps of:

(a) providing an electronic communication device having a modem circuit adapted to transmit and receive messages, a primary power source, a primary power source control circuit for selectively providing power from said primary power source to said modem circuit, a low power control clock counter for setting a first time interval during which said primary power source control circuit provides power to said modem circuit and a second time interval during which said primary power source control circuit prevents Dower from being provided from said primary power source to said modem circuit, a secondary power source Providing uninterrupted power to said low power control clock counter at least while said electronic communication device is actuated, and a logic circuit operatively coupled so as to control said modem circuit, said primary power source control circuit and said low power control clock counter;

(b) causing said primary power source control circuit to provide power to said modem circuit so that said modem circuit transmits a wake-up protocol and initialization message from said electronic communication device to a base station upon actuation of said electronic communication device;

(c) transmitting an acknowledgment message from said base station to said electronic communication device responsive to receipt of said wake-up protocol and initialization message by said base station;

(d) setting said first time interval and said second time interval in said low power control clock counter via said logic circuit based on time data provided in at least one of said wake-up protocol and initialization message and said acknowledgment message;

(e) controlling said primary power source control circuit, via said logic circuit and said low power control clock counter, such that said primary power source control circuit provides power from said primary power source to said modem circuit during said first time interval;

(f) controlling said primary power source control circuit, via said logic circuit and said low power control clock counter, such that said primary power source control circuit prevents power from being provided from said primary power source to said modem circuit during said second time interval;

(g) repeating steps (e) and (f) while said electronic communication device remains actuated.

3. The method as recited in claim 2 further including the step of:

altering said wake up protocol of said electronic communication device to comply with instructions contained within said acknowledgment message transmitted from said base station.

4. The method as recited in claim 2 further including the step of:

transmitting data from said electronic communication device to said base station during said first time interval.

5. The method as recited in claim 2 further including the step of:

transmitting data from said base station to said electronic communication device during said first time interval.

* * * * *